United States Patent
Zhang

(10) Patent No.: US 12,420,671 B2
(45) Date of Patent: Sep. 23, 2025

(54) POWER SOURCE SWITCHING SYSTEM, POWER SUPPLY CIRCUIT SWITCHING METHOD, AND ELECTRIC VEHICLE

(71) Applicant: SHARKGULF TECHNOLOGY (SHANGHAI) CO., LTD., Shanghai (CN)

(72) Inventor: Jun Zhang, Shanghai (CN)

(73) Assignee: SHARKGULF TECHNOLOGY (SHANGHAI) CO., LTD., Shanghai (CN)

( * ) Notice: Subject to any disclaimer, the term of this patent is extended or adjusted under 35 U.S.C. 154(b) by 622 days.

(21) Appl. No.: 17/777,387

(22) PCT Filed: Oct. 19, 2020

(86) PCT No.: PCT/CN2020/121763
§ 371 (c)(1),
(2) Date: May 17, 2022

(87) PCT Pub. No.: WO2021/093517
PCT Pub. Date: May 20, 2021

(65) Prior Publication Data
US 2022/0402401 A1    Dec. 22, 2022

(30) Foreign Application Priority Data
Nov. 17, 2019 (CN) .......................... 201911123867.5

(51) Int. Cl.
*H02J 7/00* (2006.01)
*B60L 53/30* (2019.01)
(Continued)

(52) U.S. Cl.
CPC ............ *B60L 58/19* (2019.02); *B60L 53/305* (2019.02); *H02J 7/0024* (2013.01); *H02J 7/36* (2013.01);
(Continued)

(58) Field of Classification Search
CPC .. H02J 7/0044; H02J 7/0013; H02J 7/007182; A47G 23/02; H04M 1/04
(Continued)

(56) References Cited

U.S. PATENT DOCUMENTS

| 9,537,331 B2 * | 1/2017 | Kim ..................... H02J 7/0016 |
| 2005/0052154 A1 * | 3/2005 | Kavounas ............... H02J 7/345 320/116 |

(Continued)

FOREIGN PATENT DOCUMENTS

| CN | 103094938 A | 5/2013 |
| CN | 107294179 A | 10/2017 |

(Continued)

OTHER PUBLICATIONS

International Search Report (with English Translation) and Written Opinion (with Machine Translation) issued on Jan. 19, 2021 in corresponding International Patent Application No. PCT/CN2020/121763; 17 pages.

*Primary Examiner* — Zixuan Zhou

(57) ABSTRACT

A power source switching system, a power supply circuit switching method and an electric vehicle. The power source switching system includes a first power source unit, a second power source unit, and a system switching control unit, the system switching control unit electrically connected to the first power source unit and the second power source unit, where the system switching control unit controls the first power source unit and the second power source unit to be connected in series or in parallel, and controls switching between the series connection of the first power source unit and the second power source unit and the parallel connection of the first power source unit and the second power source unit, implementing a charging and discharging process of the first power source unit and the second power source unit.

5 Claims, 3 Drawing Sheets

(51) Int. Cl.
*B60L 58/19* (2019.01)
*H02J 7/36* (2006.01)
(52) U.S. Cl.
CPC ....... *B60Y 2200/91* (2013.01); *H02J 2310/48* (2020.01)
(58) Field of Classification Search
USPC .................................................. 320/103, 107
See application file for complete search history.

(56) References Cited

U.S. PATENT DOCUMENTS

| | | | |
|---|---|---|---|
| 2012/0112685 A1* | 5/2012 | Hartley | H02J 7/0013 320/106 |
| 2014/0097785 A1 | 4/2014 | Henness | |
| 2018/0056798 A1* | 3/2018 | Syouda | B60L 58/15 |
| 2018/0069428 A1* | 3/2018 | Hsieh | H02J 7/0068 |

FOREIGN PATENT DOCUMENTS

| | | |
|---|---|---|
| CN | 108512269 A | 9/2018 |
| CN | 110224455 A | 9/2019 |
| CN | 110843605 A | 2/2020 |

\* cited by examiner

POWER SOURCE SWITCHING SYSTEM, POWER SUPPLY CIRCUIT SWITCHING METHOD, AND ELECTRIC VEHICLE

CROSS-REFERENCE TO RELATED APPLICATION

This patent application claims the benefit and priority of Chinese Patent Application No. 201911123867.5 filed on Nov. 17, 2019, the disclosure of which is incorporated by reference herein in its entirety as part of the present application.

TECHNICAL FIELD

The present invention relates to the field of circuit control technologies, and specifically to a power source switching system, a power supply circuit switching method, and an electric vehicle.

BACKGROUND

With the rise of lithium batteries and the promotion of the national new energy strategy, lithium battery electric two-wheelers are gaining market share. However, due to limitations from industry conditions, a single small-capacity battery is used so as to be easily taken out for charging; or a built-in large-capacity battery is used to improve the power range, but the battery can only be charged on board. Some enterprises have begun to use a dual-battery arrangement, but only in direct series or parallel and without free series-parallel switching in the dual-battery mode.

SUMMARY

An objective of embodiments of the present invention is to provide a power source switching system, a power supply circuit switching method, and an electric vehicle, which enables operation in a single-battery mode and free series-parallel switching in a dual-battery mode, making it possible to freely switch an operating mode of a power source as required.

According to a first aspect, the present invention discloses a power source switching system, including a first power source unit, a second power source unit, and a system switching control unit, the system switching control unit being electrically connected to the first power source unit and the second power source unit, where the system switching control unit controls the first power source unit and the second power source unit to be connected in series or in parallel, and controls switching between the series connection of the first power source unit and the second power source unit and the parallel connection of the first power source unit and the second power source unit, thereby implementing a charging and discharging process of the first power source unit and the second power source unit.

Compared with the prior art, the technical solution disclosed in the present invention can implement free switching according to specific requirements, which may be switching to a single-power-source operating mode, a dual-power-source operating mode, or free series-parallel switching in the dual-power-source operating mode. An operating mode of a power source unit can be freely switched according to power output of an electric vehicle, thereby improving user experience.

According to a second aspect, the present invention discloses a power supply circuit switching method for the power source switching system disclosed in at least one of the technical solutions described above, the method including:

determining whether it is a single-battery connection or a dual-battery connection, and if it is a dual-battery connection, controlling to close the first switch, the second switch, and the fourth switch, and to open the third switch and the fifth switch, such that the first power source unit and the second power source unit enter the series charging and discharging mode; or controlling to close the first switch, the second switch, the third switch, and the fifth switch, and to open the fourth switch, such that the first power source unit and the second power source unit enter the parallel charging and discharging mode;

in the discharging process of a first battery and a second battery, making a comparison on discharged power of the first battery and the second battery, and when the discharged power reaches a preset threshold, turning off one of the batteries having lower remaining power, to enter an operating mode of single-battery discharging; and if a single battery is plugged in, closing the first switch and the third switch, opening the second switch, the fourth switch, and the fifth switch, such that the first power source unit enters the operating mode of single-power-source charging and discharging; or closing the second switch and the third switch, and opening the first switch, the fourth switch, and the fifth switch, such that the second power source unit enters the operating mode of single-power-source charging and discharging.

Compared with the prior art, the beneficial effects of the power supply circuit switching method for the power source switching system disclosed in the present invention are the same as those of the power source switching system disclosed in at least one of the technical solutions described above, and details are not repeated herein.

According to a third aspect, the present invention further provides an electric vehicle provided with the power source switching system disclosed in at least one of the technical solutions described above.

Compared with the prior art, the beneficial effects of the electric vehicle disclosed in the present invention are the same as those of the power source switching system disclosed in at least one of the technical solutions described above, and details are not repeated herein.

BRIEF DESCRIPTION OF THE DRAWINGS

In order to more clearly describe the technical solutions in the embodiments of the present invention or in the prior art, the drawings required for describing the embodiments or the prior art will be briefly described below. Apparently, the drawings in the following description show some of the embodiments of the present invention, and those of ordinary skill in the art may still derive other drawings from these drawings without involving any inventive effort.

DETAILED DESCRIPTION OF EMBODIMENTS

Figure 1:
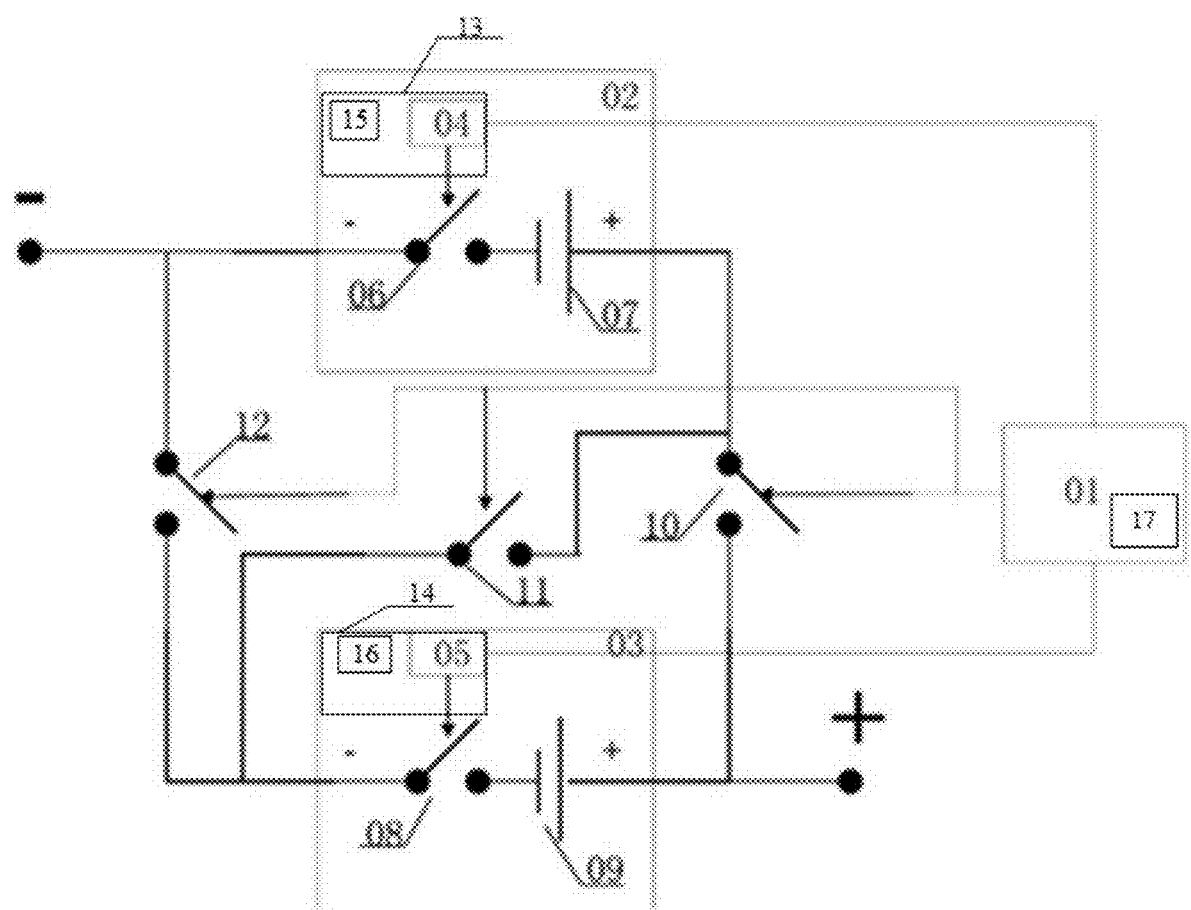
FIG. 1 is a schematic structural diagram of a power source switching system disclosed in the present invention.

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the embodiments described are some rather than all of the embodiments of the present invention. All other embodiments derived by those of ordinary skill in the art on the basis of the embodiments of the present invention without any inventive effort shall fall within the scope of protection of the present invention.

It should be noted that, in the description, claims, and accompanying drawings of the present invention, the terms such as "first" and "second" are used for distinguishing similar objects, but are not necessarily used for describing a specific sequence or order. It should be understood that the data termed in such a way is interchangeable in proper circumstances so that the embodiments of the present invention described herein can be implemented in an order other than the order illustrated or described herein.

The applicant has found the following problem in the prior art through research. With the rise of lithium batteries and the promotion of the national new energy strategy, lithium battery electric two-wheelers are gaining market share. However, due to limitations from industry conditions, a single small-capacity battery is used so as to be easily taken out for charging; or a built-in large-capacity battery is used to improve the power range, but the battery can only be charged on board. Some enterprises have begun to use a dual-battery arrangement, but only in direct series or parallel and without free series-parallel switching in the dual-battery mode.

In order to resolve the above problem, the embodiments of the present invention disclose a power source switching system, including a first power source unit, a second power source unit, and a system switching control unit, the system switching control unit being electrically connected to the first power source unit and the second power source unit, where the system switching control unit controls the first power source unit and the second power source unit to be connected in series or in parallel, and controls switching between the series connection of the first power source unit and the second power source unit and the parallel connection of the first power source unit and the second power source unit, thereby implementing a charging and discharging process of the first power source unit and the second power source unit. The technical solution disclosed in the present invention can implement free switching according to specific requirements, which may be switching to a single-power-source operating mode, a dual-power-source operating mode, or free series-parallel switching in the dual-power-source operating mode. An operating mode of a power source unit can be freely switched according to power output of an electric vehicle, thereby improving user experience.

Therefore, in order to resolve the above problem, the present invention will be described in detail through the embodiments.

Various non-limiting implementations of the present invention are described in detail below in conjunction with the accompanying drawings.

FIG. 1 is a schematic structural diagram of a power source switching system disclosed in the present invention.

The present invention discloses a power source switching system, including a first power source unit 02, a second power source unit 03, and a system switching control unit 01. The first power source unit 02 includes a first power source management system 13, a first switch 06, and a first power source 07, the first power source management system 13 includes a first power source control unit 04, the first power source control unit 04 is electrically connected to the system switching control unit 01, and the system switching control unit 01 controls the first switch 06 to be turned on/off via the first power source control unit 04. The second power source unit 03 includes a second power source management system 14, a second switch 08, and a second power source 09, the second power source management system 14 includes a second power source control unit 05, the second power source control unit 05 is electrically connected to the system switching control unit 01, and the system switching control unit 01 controls the second switch 08 to be turned on/off via the second power source control unit 05. The first power source management system 13 and the second power source management system 14 are further provided with a first communications interface 15 and a second communications interface 16, respectively. The first communications interface 15 and the second communications interface 16 are respectively used for state information transmission of the first power source 07 and the second power source 09.

It should be noted that, generally, the system switching control unit 01 is electrically connected to the first power source unit 02 and the second power source unit 03, the first power source unit 02 and the second power source unit 03 are controlled by the system switching control unit 01 to implement a series or parallel connection of the first power source unit 02 and the second power source unit 03, and the system switching control unit 01 controls switching between the series connection of the first power source unit 02 and the second power source unit 03 and the parallel connection of the first power source unit 02 and the second power source unit 03, so as to implement a charging and discharging process of the first power source unit 02 and the second power source unit 03.

In this embodiment of the present invention, the system switching control unit 01 controls switching between the series connection of the first power source unit 02 and the second power source unit 03 and the parallel connection of the first power source unit 02 and the second power source unit 03, so as to implement the charging and discharging process of the first power source unit 02 and the second power source unit 03, and this is mainly implemented by controlling the related switches.

Specifically, the present invention further includes a third switch 10, a fourth switch 11, and a fifth switch 12, where the third switch 10, the fourth switch 11, and the fifth switch 12 each are electrically connected to the system switching control unit 01. When the first switch 06 and the second switch 08 are closed, the switching between the series connection of the first power source unit 02 and the second power source unit 03 and the parallel connection of the first power source unit 02 and the second power source unit 03 by controlling to turn on or off the third switch 10, the fourth switch 11, and the fifth switch 12.

The third switch 10 is provided on a common terminal of positive terminals of the first power source unit 02 and the second power source unit 03, the fifth switch 12 is provided on a common terminal of negative terminals of the first power source unit 02 and the second power source unit 03, one terminal of the fourth switch 11 is connected to the common terminal of the positive terminals of the first power source unit 02 and the second power source unit 03, and the other terminal of the fourth switch 11 is connected to the common terminal of the negative terminals of the first power source unit 02 and the second power source unit 03.

Operating modes of the first switch 06, the second switch 08, the third switch 10, the fourth switch 11, and the fifth switch 12 are as follows: When the first switch 06 and the third switch 10 are closed, and the second switch 08, the fourth switch 11, and the fifth switch 12 are open, the first power source unit 02 enters an operating mode of single-power-source charging and discharging, that is, charging or discharging with a single battery.

When the second switch 08 and the third switch 10 are closed, and the first switch 06, the fourth switch 11, and the fifth switch 12 are open, the second power source unit 03 enters an operating mode of single-power-source charging and discharging, that is, charging or discharging with a single battery.

When the first switch 06, the second switch 08, the third switch 10, and the fifth switch 12 are closed, and the fourth switch 11 is open, the first power source unit 02 and the second power source unit 03 enter a parallel charging and discharging mode, that is, the first power source unit 02 and the second power source unit 03 are charged or discharged in a parallel connected state.

When the first switch 06, the second switch 08, and the fourth switch 11 are closed, and the third switch 10 and the fifth switch 12 are open, the first power source unit 02 and the second power source unit 03 enter a series charging and discharging mode, that is, the first power source unit 02 and the second power source unit 03 are charged or discharged in a series connected state.

In an embodiment disclosed in the present invention, the system switching control unit 01 further includes: a comparison unit 17. In the discharging process of the first power source 07 and the second power source 09, the comparison unit 17 makes a comparison on discharged power of the first power source 07 and the second power source 09, and when the discharged power reaches a preset threshold, one of the power sources having lower remaining power is turned off, to enter an operating mode of single-power-source discharging.

It should be noted that, to avoid full power discharge of a battery in the process of dual-battery discharging, in this embodiment of the present invention, a comparison unit 17 is provided in the system switching control unit 01, to make a comparison between power information of the first power source 07 and the second power source 08 obtained by the first power source management system 13 and the second power source management system 14 in the first power source unit 02 and the second power source unit 03 and a preset threshold. If the remaining power of one of the power sources reaches the preset threshold, the system switching control unit 01 controls to disconnect the corresponding switch, and stops the power source from outputting power. In this case, only the power source having higher remaining power still operates, until this power source also reaches the preset threshold, and then the system switching control unit 01 controls to open the corresponding switch, and stops the power source from outputting power.

Compared with the prior art, the technical solution disclosed in the present invention can implement free switching according to specific requirements, which may be switching to a single-power-source operating mode, a dual-power-source operating mode, or free series-parallel switching in the dual-power-source operating mode. An operating mode of a power source unit can be freely switched according to power output of an electric vehicle, thereby improving user experience.

According to another aspect, an embodiment of the present invention further provides a power supply circuit switching method for the power source switching system, the method including:

step 1: determining whether it is a single-battery connection or a dual-battery connection, and if it is a dual-battery connection, controlling to close the first switch, the second switch, and the fourth switch, and to open the third switch and the fifth switch, such that the first power source unit and the second power source unit enter the series charging and discharging mode; or controlling to close the first switch, the second switch, the third switch, and the fifth switch, and to open the fourth switch, such that the first power source unit and the second power source unit enter the parallel charging and discharging mode;

if a single battery is plugged in, closing the first switch and the third switch, opening the second switch, the fourth switch, and the fifth switch, such that the first power source unit enters the operating mode of single-power-source charging and discharging; or closing the second switch and the third switch, and opening the first switch, the fourth switch, and the fifth switch, such that the second power source unit enters the operating mode of single-power-source charging and discharging; and step 2: in the discharging process of a first battery and a second battery, making a comparison on discharged power of the first battery and the second battery, and when the discharged power reaches a preset threshold, turning off one of the batteries having lower remaining power, to enter an operating mode of single-battery discharging.

Figure 2:
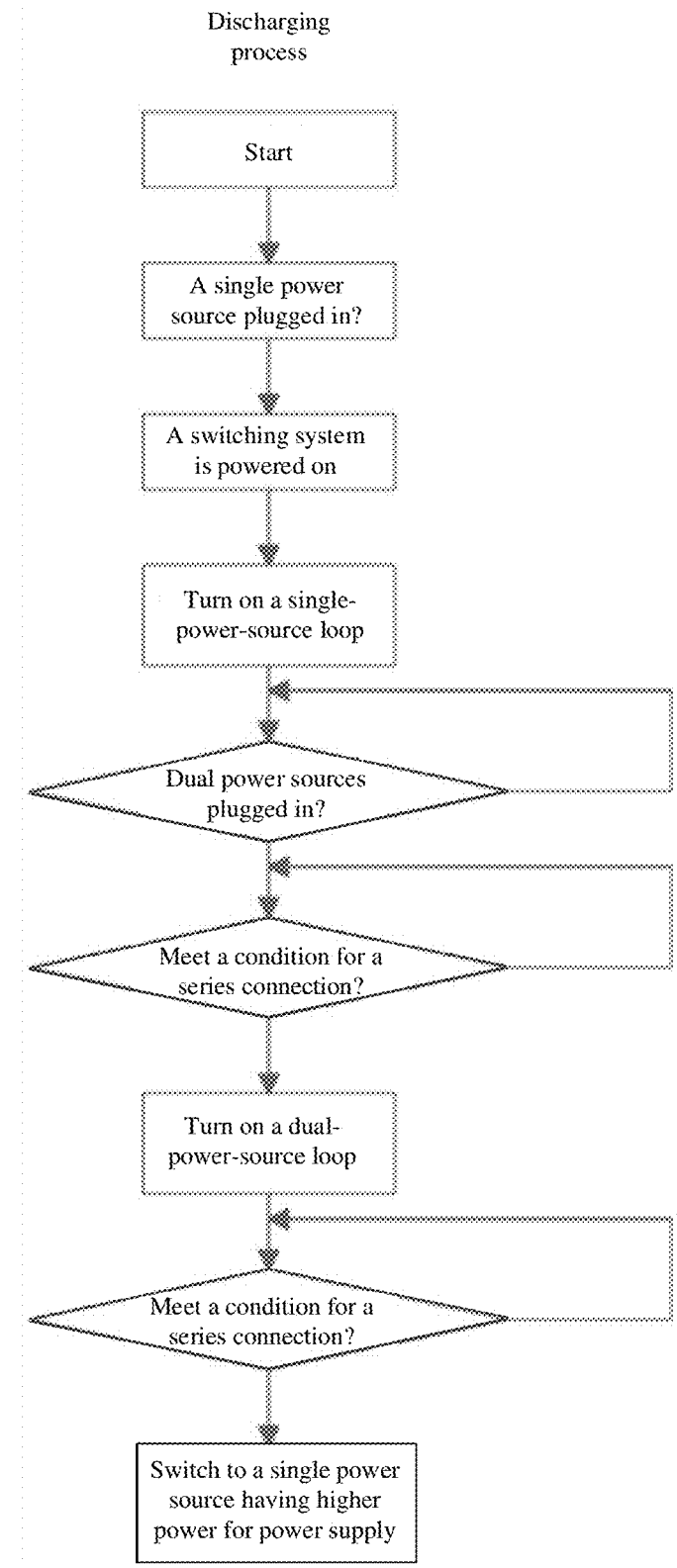
FIG. 2 is a flowchart of a power source discharging process disclosed in the present invention.

FIG. 2 is a flowchart of a power source discharging process disclosed in the present invention.

If it is determined that a single power source is plugged in, the system switching control unit controls the switching system to power on, and turns on a single-power-source loop to supply power to the electric vehicle. In the discharging process of a single power source, if another power source is plugged in to form dual power sources, and it is determined that the dual power sources are plugged in and that the plugged-in dual power sources meet the series connection of the dual power sources, a dual-power-source loop is turned on to supply power to the electric vehicle. In the discharging process of the dual power sources, if discharged power of one of the power sources reaches the preset threshold, the power source having lower remaining power is turned off, to enter an operating mode of single-power-source discharging.

Similarly, if the plugged-in dual power sources meet the parallel connection of the dual power sources, a dual-power-source loop is turned on to supply power to the electric vehicle. In the discharging process of the dual power sources, if discharged power of one of the power sources reaches the preset threshold, the power source having lower remaining power is turned off, to enter an operating mode of single-power-source discharging.

Figure 3:
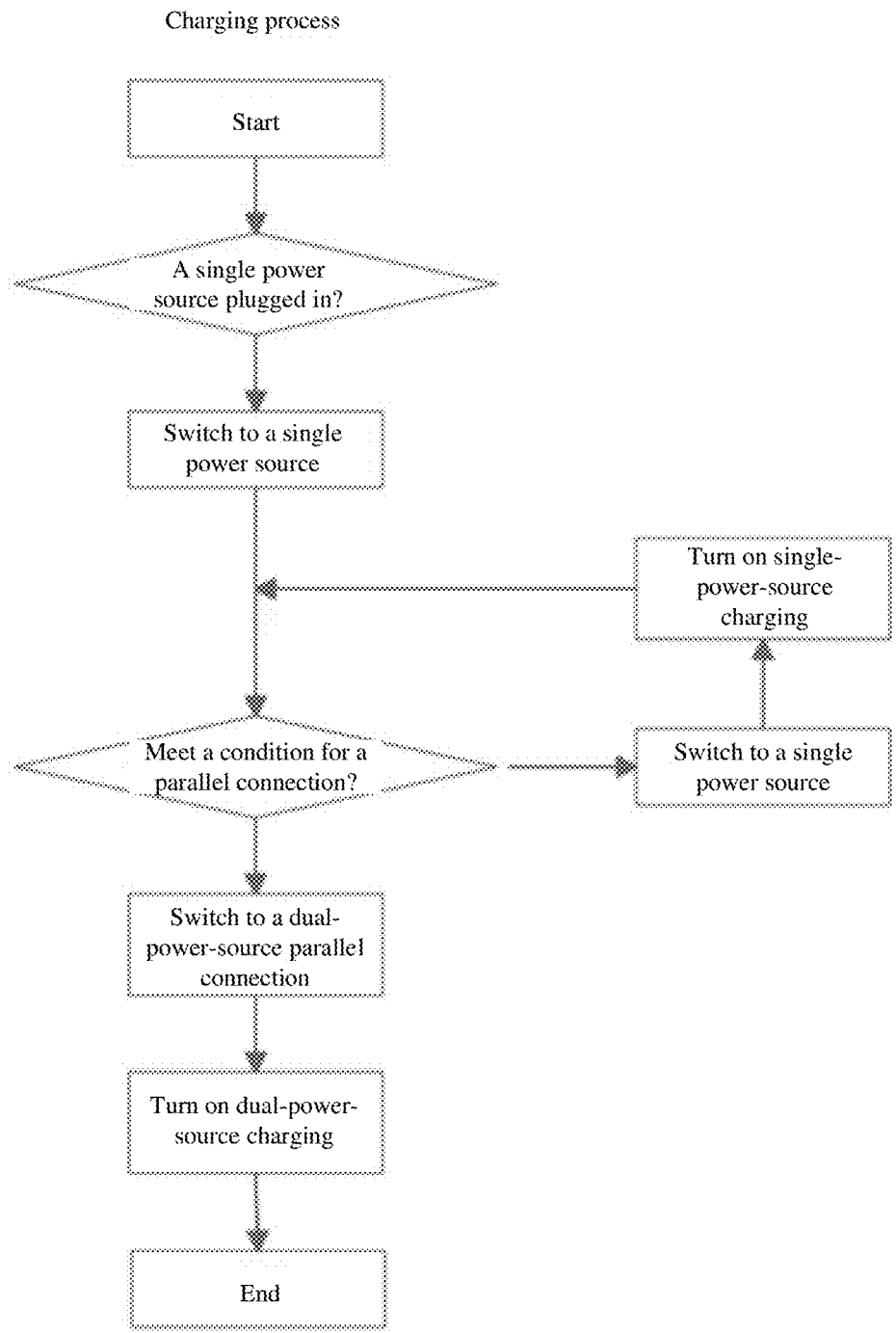
FIG. 3 is a flowchart of a power source charging process disclosed in the present invention.

FIG. 3 is a flowchart of a power source charging process disclosed in the present invention.

It should be noted that in the charging process, the power sources may be charged on board, or the power sources may be taken out for charging. If the power sources are taken out for charging, series-parallel switching cannot be implemented in the charging process of the power sources.

The following charging process is charging on board.

First, one power source is plugged in for charging, and the system switching control unit may control to perform a single-power-source charging mode. Then, if another power source is plugged in, and a condition for the parallel connection of dual power sources is met, it is switched to dual-power-source charging in parallel. If the condition for the parallel connection of dual power sources is not met, it is switched to single-power-source charging.

Similarly, if a condition for the series connection of dual power sources is met, it is switched to dual-power-source charging in series. If the condition for the series connection of dual power sources is not met, it is switched to single-power-source charging.

According to a third aspect, an embodiment of the present invention further provides an electric vehicle provided with the power source switching system described above.

Compared with the prior art, the beneficial effects of the electric vehicle disclosed in the present invention are the same as those of the power source switching system in the technical solutions described above, and details are not repeated herein.

Finally, it should be noted that the foregoing embodiments are only used to illustrate the technical solutions of the present invention, and are not intended to limit same. Although the present invention is described in detail with reference to the foregoing embodiments, those of ordinary skill in the art should understand that they can still modify the technical solutions described in the foregoing embodiments, or make equivalent substitutions to some or all technical features therein. These modifications or substitutions do not make the essence of the corresponding technical solutions depart from the scope of the technical solutions of the embodiments of the present invention.

What is claimed is:

1. A power source switching system, comprising: a first power source unit, a second power source unit, and a system switching control unit, the system switching control unit being electrically connected to the first power source unit and the second power source unit, wherein the system switching control unit controls the first power source unit and the second power source unit to be connected in series or in parallel, and controls switching between the series connection of the first power source unit and the second power source unit and the parallel connection of the first power source unit and the second power source unit, thereby implementing a charging and discharging process of the first power source unit and the second power source unit; wherein the first power source unit comprises a first power source management system, a first switch, and a first power source, the first power source management system comprises a first power source control unit, the first power source control unit is electrically connected to the system switching control unit, and the system switching control unit controls the first switch to be turned on/off via the first power source control unit;

and the second power source unit comprises a second power source management system, a second switch, and a second power source, the second power source management system comprises a second power source control unit, the second power source control unit is electrically connected to the system switching control unit, and the system switching control unit controls the second switch to be turned on/off via the second power source control unit;

wherein the power source switching system further comprises a third switch, a fourth switch, and a fifth switch, wherein the third switch, the fourth switch, and the fifth switch each are electrically connected to the system switching control unit; and wherein the third switch is provided on a common terminal of positive terminals of the first power source unit and the second power source unit, the fifth switch is provided on a common terminal of negative terminals of the first power source unit and the second power source unit, one terminal of the fourth switch is connected to the common terminal of the positive terminals of the first power source and the second power source, and the other terminal of the fourth switch is connected to the common terminal of the negative terminals of the first power source unit and the second power source unit;

when the first switch and the third switch are both closed, and the second switch, the fourth switch, and the fifth switch are all open, the first power source unit enters an operating mode of single-power-source charging and discharging;

when the second switch and the third switch are both closed, and the first switch, the fourth switch, and the fifth switch are all open, the second power source unit enters an operating mode of single-power-source charging and discharging;

when the first switch, the second switch, the third switch, and the fifth switch are closed, and the fourth switch is open, the first power source unit and the second power source unit enter a parallel charging and discharging mode; and when the first switch, the second switch, and the fourth switch are closed, and the third switch and the fifth switch are open, the first power source unit and the second power source unit enter a series charging and discharging mode.

2. The power source switching system of claim 1, wherein the first power source management system and the second power source management system are further provided with a first communications interface and a second communications interface, respectively, and the first communications interface and the second communications interface are respectively used for state information transmission of the first power source and the second power source.

3. The power source switching system of claim 2, wherein the system switching control unit comprises a comparison unit; in the discharging process of the first power source and the second power source, the comparison unit makes a comparison on discharged power of the first power source and the second power source, and when the discharged power reaches a preset threshold, one of the power sources having lower remaining power is turned off, to enter an operating mode of single-power-source discharging.

4. A power supply circuit switching method for the power source switching system of claim 1, the method comprising:
determining whether it is a single-battery connection or a dual-battery connection, and if it is a dual-battery connection, controlling to close the first switch, the second switch, and the fourth switch, and to open the third switch and the fifth switch, such that the first power source unit and the second power source unit enter the series charging and discharging mode; or controlling to close the first switch, the second switch, the third switch, and the fifth switch, and to open the fourth switch, such that the first power source unit and the second power source unit enter the parallel charging and discharging mode;

if a single battery is plugged in, closing the first switch and the third switch, opening the second switch, the fourth switch, and the fifth switch, such that the first power source unit enters the operating mode of single-power-source charging and discharging; or closing the second switch and the third switch, and opening the first switch, the fourth switch, and the fifth switch, such that the second power source unit enters the operating mode of single-power-source charging and discharging; and in the discharging process of a first battery and a second battery, making a comparison on discharged power of the first battery and the second battery, and when the discharged power reaches a preset threshold, turning off one of the batteries having lower remaining power, to enter an operating mode of single-battery discharging.

5. An electric vehicle provided with the power source switching system of claim 1.

* * * * *